Feb. 10, 1942.  A. B. SCHAEFER  2,272,852
SETTING OR CLAMPING SCREW
Filed June 28, 1940
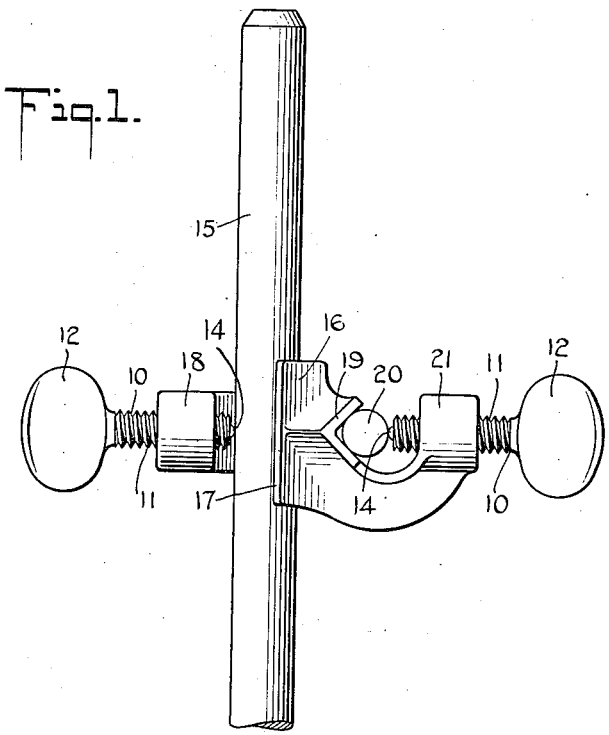
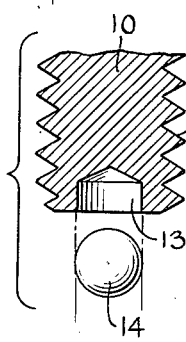
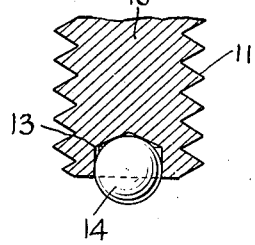
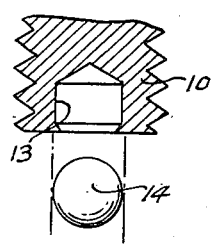
INVENTOR
Albert B. Schaefer
BY
HIS ATTORNEY Patented Feb. 10, 1942

2,272,852

UNITED STATES PATENT OFFICE 2,272,852

SETTING OR CLAMPING SCREW

Albert B. Schaefer, New York, N. Y.

Application June 28, 1940, Serial No. 342,919

3 Claims. (Cl. 85—1)

My present invention relates to clamping devices and more particularly to an improved set or clamping screw.

A feature of my invention is an improved means, desirably a spherical ball, inset into the end of a set screw or clamping screw and by the aid of which a firm grip may be had upon an article to be clamped or otherwise held in position, with the exercise of minimum effort, and whereby effective clamping or holding is had practically without deforming the surface or contour of the article clamped. My invention is particularly effective for clamping cylindrical rods or other arcuately shaped articles, whereby contact between the ball or equivalent with the cylindrical rod or other arcuate article is attained most readily and accurately while maintaining without deformation, the cylindrical or arcuate surface of the article clamped.

By having the inset member in the end of the set screw, the end of such set screw never comes into contact with the member to be clamped. Therefore, the end of the set screw will never become burred up or flattened as in previous devices of this kind.

In my improved clamping screw, the diameter of the ball should be equal to or slightly larger than the diameter of the opening in the end of the screw, whereby the ball, when forcibly inset into the end of the screw, is fixed therein against rotation with respect to the screw. The fixed ball has no "bearing" or "caster" effect and is immediately effective to exert clamping effect on the object to be held with minimum tightening of the screw per se.

A particular field of utility of my invention resides in clamping means for laboratory apparatus such as glass tubing or other fragile articles which may, nevertheless, be of substantial weight. In devices wherein the ball is loosely contained within the end of the screw, it is necessary to tighten the screw with substantial force to jam the ball between the clamped article and the screw, before any clamping effect is exerted. Otherwise, the weight of a heavy object may cause the ball to rotate within its screw mounting, negativing any clamping action. By fixing the ball within the screw, however, the engagement of the ball with the object being clamped is immediately effective with minimum adjustment of the setting screw.

An object of my invention, therefore, is to provide an improved clamping screw having a ball fixed in an end thereof, whereby maximum clamping effect may be obtained without the exertion of undue pressure on an object clamped thereby.

In the accompanying drawing:

Fig. 1 is a side elevation of a laboratory clamp showing the same held in position on a vertical standard with the aid of a set or clamping screw embodying my invention, and showing my invention in side elevation.

Fig. 2 is a central sectional elevation through the lower threaded end of a set or clamping screw embodying my invention showing the cavity in the end of such set or clamping screw and ready to receive a member forming a feature of my invention;

Fig. 3 is a view similar to Fig. 2 but showing parts in operative and stable relation to each other; and Fig. 4 is a central sectional elevation similar to Fig. 2, showing an embodiment of the invention wherein the socket portion is undercut to provide a mouth which is of less diameter than the diameter of the socket.

Referring to the drawing there is shown a threaded body 10, of suitable diameter and length, provided with threads 11 throughout its length. The body 10 has formed integral therewith at one end a thumb portion 12 and by means of which the threaded body 10 may be rotated. In place of the thumb portion 12 there may be formed integral with the threaded body 10 a non-cylindrical or other suitably shaped head which may be engaged by a wrench or other instrumentality, and by means of which the body 10 may be rotated.

Extending axially into the body 10 at the end remote from the thumb portion 12 is a preferably drilled depression or socket 13 preferably cylindrical in outline with a conical seat as clearly shown in Figs. 2 and 3 and of any suitable diameter and depth. For practical reasons I prefer to have the socket 13 undercut, that is with the inner diameter thereof slightly greater than the diameter at the outer end of the socket 13. Such formation is illustrated in Fig. 4.

Associated with the socket 13 is a ball 14, preferably of steel, and either hardened or soft as may be desired. The diameter of the ball 14 is slightly larger than the outer diameter of the socket 13 at the end of the body 10 as shown in Fig. 2. The depth of the socket 13 is slightly greater than a radius of the ball 14, so that when the ball 14 has been inserted into the socket 13, the ball 14 is slightly more than half encased within the socket 13. As shown in Figures 2 and 3, the diameter of the socket 13 is substantially equal to the diameter of the ball 14, whereupon after the ball 14 has been inserted into the socket, the side walls of the socket are tangential to the ball, and the walls of the conical seat of the socket are also tangential to the surface of the ball, thereby frictionally securing said ball with respect to the body 10.

The ball 14 is inserted into the socket 13 and held in operative relation therein by any suitable arrangement or procedure. A suitable arrangement and procedure is to drive the ball 14 through the relatively reduced diameter of the outer opening of the socket 13 and into the socket, the resiliency of the material of the body 10 at and about the outer opening permitting passage therethrough of the ball.

One use of my invention is illustrated in Fig. 1, where 15 designates a standard for holding test tubes, rubber hose, or the like and on which is adjustably mounted a bracket 16. This bracket 16 is provided with a vertical slot 17, V-shaped to receive the standard 15. Formed integral with the bracket 16, but spaced apart from the V slot 17, is an arm 18 threaded to receive the threads 11 on the threaded body 10 of a clamp or set screw embodying my invention. One of such set screws is shown in position holding the bracket 16 firmly in adjusted position on the standard 15.

Also formed in the bracket 16 is a V-slot 19 shown as lying at right angles to the V-slot 17. Mounted within the slot 17 is a rod or bar 20 with which engages a set or clamp screw embodying my invention. The set or clamp screw is threaded through an arm 21 as clearly shown in Fig. 1.

I have found that the use of a hardened steel ball 14 as a direct clamping engaging member is the most efficient type of device for my purpose, requiring but slight force to bring the same into full operative engagement with the article and cooperating with the V-slots to hold the desired article rigidly in position. Further the device may be released without the expenditure of a great deal of force.

Whereas I have described my invention by reference to specific forms thereof, it will be understood that many changes and modifications may be made without departing from the spirit of the invention.

I claim:

1. A clamping screw provided with an elongated threaded body, said body having a suitably shaped head for engagement with means for rotating said screw, a socket formed at the opposite end of the body, said socket having its inner end conical in form, and a hardened metal ball driven into said socket in contact with the side walls thereof and the wall of the conical end, whereby said ball is held tightly within said socket, said socket having a depth less than the diameter of the ball but greater than the radius thereof.

2. A clamping device having an elongated body, a socket formed at one end of the body, and a hardened metal ball driven into said socket in tight engagement with the side walls thereof, whereupon said ball is fixed within said socket, said socket having a depth less than the diameter of the ball but greater than the radius thereof.

3. A clamping screw provided with an elongated threaded body, said body having a suitably shaped head for engagement with means for rotating said screw, a socket formed at the opposite end of the body, and a hardened metal ball driven into said socket in tight engagement with the side walls thereof, whereupon said ball is fixedly held within said socket, said socket having a depth less than the diameter of the ball but greater than the radius thereof and the diameter of the opening of the mouth of the socket being slightly less than the diameter of the ball.

ALBERT B. SCHAEFER.